United States Patent

[11] 3,578,953

[72] Inventors Richard E. Milford;
George Maclean, Phoenix, Ariz.

[21] Appl. No. 764,660
[22] Filed Oct. 3, 1968
[45] Patented May 18, 1971
[73] Assignee Honeywell Information Systems Inc.

[54] SYSTEM FOR READING INTERMIXED MARKS AND SYMBOLS FROM DOCUMENTS
12 Claims, 12 Drawing Figs.

[52] U.S. Cl. .......... 235/61.11, 340/146.3
[51] Int. Cl. .......... G06r 7/00
[50] Field of Search .......... 235/61.11, 61.115, 61.115 (CR), 61.12, 61.111, 61.114, 61.603; 340/146.3

[56] References Cited

UNITED STATES PATENTS

| | | | |
|---|---|---|---|
| 2,690,300 | 9/1954 | Wilson .......... | 235/61.11 |
| 3,033,449 | 5/1962 | Quinn et al. .......... | 235/61.11 |
| 3,128,372 | 4/1964 | Braun .......... | 235/61.11 |

*Primary Examiner*—Thomas A. Robinson
*Attorneys*—George V. Eltgroth, Frank L. Neuhauser, Edward W. Hughes, George R. Powers and Joseph B. Forman

ABSTRACT: A system for automatically reading marks and symbols printed on one or more sides of a document in one or more different formats.

INVENTORS.
RICHARD E. MILFORD
GEORGE MACLEAN

CUSTOMER BILL STUB

CUSTOMER BILL STUB

CUSTOMER BILL STUB

CUSTOMER BILL STUB

SYSTEM FOR READING INTERMIXED MARKS AND SYMBOLS FROM DOCUMENTS

BACKGROUND OF THE INVENTION

This invention relates to systems for reading marks and symbols and more particularly to means for reading documents which have machine recognizable mark sense information, machine printable and recognizable symbols and intermixed combinations thereof stored on one or both sides of a document.

1. Field of the Invention

The invention is particularly utilized in high-speed data processing systems wherein information to be processed is supplied from an external source. This external source of information may be information bearing mediums such as magnetic tapes, thermoplastic recording tapes, punched cards, and documents bearing magnetic ink imprints, optically recognizable coded imprints and machine or hand-recorded marks.

Systems for separately reading only marks or symbols from a document and for producing corresponding electrical signals as the document is moved past a reading device are now known. They find increasing use in the automation of data handling such as the automatic processing of documents for customer billing, public utility meter reading, inventory control and the like.

Documents containing both marks and symbols in separate areas termed "fields" arranged according to a predetermined format are now being employed. For example, in the automation of public utility meter reading and billing, operations termed "turnaround" and "reentry" are being used. The data processing system high-speed printer prints in visual and machine readable symbols the previous meter reading on a form and a meter reader marks the new meter reading in a mark sense field of the form. A reentry is then performed whereby the system reenters the previous reading and reads the new reading marks for computing and printing, in symbols, the amount due on a customer bill. When the bill is returned, a cashier marks the amount submitted in a mark sense field of the bill and a second reentry and read operation is performed by the system to update the customer account prior to printing a new meter reading form, thus providing a complete "turnaround" operation.

The mark sense field may, for example, provide a number of possible marking areas which are associated with each of a plurality of information units such as digits corresponding to a multiunit item representing a meter reading or dollar amount. The marking areas are normally arranged in a matrix of a predetermined number of columns and rows. A mark in the form of a pencil or ink pen line representing a unit of the item may be recorded in a designated area at the intersection of any column and row. Accordingly, the column position may correspond to the place of the unit in the item and the row position of each mark may represent the unit according to the well-known Hollerith code. The Hollerith code utilizes 10 rows for storing a decimal digit in a given column and 12 rows for storing both numeric and alphabetical information units. The information units may be read column-by-column in a manner to be described hereinafter. Since such a mark sense field may occupy a large area of the document, there is the tendency to increase the document size or to use two documents to accommodate printing fields for symbols, instructions and the like.

Accordingly, it is desirable to utilize more of the area of a document than to increase the document size or the number of documents used in a data handling system. This may be accomplished by utilizing the advantages of combining mark sense information and machine recognizable symbols on the same document. The mark sense information and the machine recognizable symbols may be read during a single movement of the document past a reading station, thereby reducing document handling and the need for providing separate documents for each type of information to be entered into a data processing system.

2. Description of the Prior Art

One prior art system for automatically recognizing both mark sense information and symbols intermixed on one side only of a document reads a font having continuous line optically recognizable stylized symbols. Symbol recognition is accomplished by a complex symbol reading system which utilizes a flying spot scanning transducer to focus light from a spot being scanned upon a light-sensitive device for transforming the light into an electrical signal. Mark sense reading is accomplished by a separate optical system utilizing a row of preprinted timing marks arranged along the bottom edge of the document to provide timing for each column to be read. The timing mark synchronizes and controls an optical to electrical transducer and amplifier circuit associated with each of a plurality of reading and timing channels. This circuitry produces electrical signals responsive to reflected light variations in the presence of a mark in a channel.

Thus, the prior art system has the disadvantages of reading from one side only of a document, of requiring a specific timing row position along one edge of the document, and of requiring an expensive and complex symbol recognition system which recognizes a font having a continuous line symbol which cannot be readily printed within required tolerances by data processing system high-speed printers.

SUMMARY OF THE INVENTION

In accordance with the invention claimed, a new and improved intermixed mark and symbol reading system is provided for sensing marks and symbols on one or both sides of a document during a single pass of the document through a document reading station. The document reading station comprises two optical symbol transducers and an optical mark transducer. The transducers are spaced apart such that the optical mark transducer scans marks recorded in the row position of a column before the symbols are scanned by the symbol transducers. The mark recognition system is initially enabled, and the optical recognition system is conditionally enabled prior to scanning the marks. A signal to begin reading marks is given to the mark recognition system by the detection of a timing mark and mark reading continues until the mark transducer detects a predetermined terminating mark preprinted on the document which disables the mark recognition system prior to the scanning of the optical symbols.

Each of the optical symbol transducers is disposed on opposite sides of the document being read such that a control signal from a control means allows selective reading of symbols from either side of the document. The control signal selectively connects one of the symbol transducers at a time to one common symbol reading system to implement the reading of the symbols. The control means further selectively controls the mark sense reader so that *m* or *n* rows of mark sense information may be read, thereby eliminating the need for the timing row to be placed along one edge of the document.

In the case of having a plurality of rows of optical symbols on one side of a document, the rows are read individually and singly by separate passes of the document past the two reading transducers. For example, to read two rows of symbols on one side of the document, one row must be read by a symbol transducer which is located on one side of the document and the second row is read when the document is turned over with edges reversed and passed by the second symbol transducer which is located on the opposite side of the document. Since both symbol transducers are selectively coupled to one symbol reading system, a plurality of rows of symbols on one side of a document are read by a relatively inexpensive symbol recognition system.

It is, therefore, an object of this invention to provide an improved and more reliable reading system for reading intermixed symbols and marks on a document.

It is another object of this invention to provide a symbol and mark reading system which permits more effective utilization of document record areas.

It is still another object of this invention to provide a more economical symbol reading system for reading a plurality of rows of symbols on a document.

It is yet another object of this invention to provide an improved reading system for reading symbols and marks on opposite sides of a document.

Further objects and advantages of the present invention will become apparent to those skilled in the art as the description thereof proceeds.

BRIEF DESCRIPTION OF THE DRAWING

The present invention may be more readily described by reference to the accompanying drawings in which.

DETAILED DESCRIPTION OF OPERATION

Figure 1:
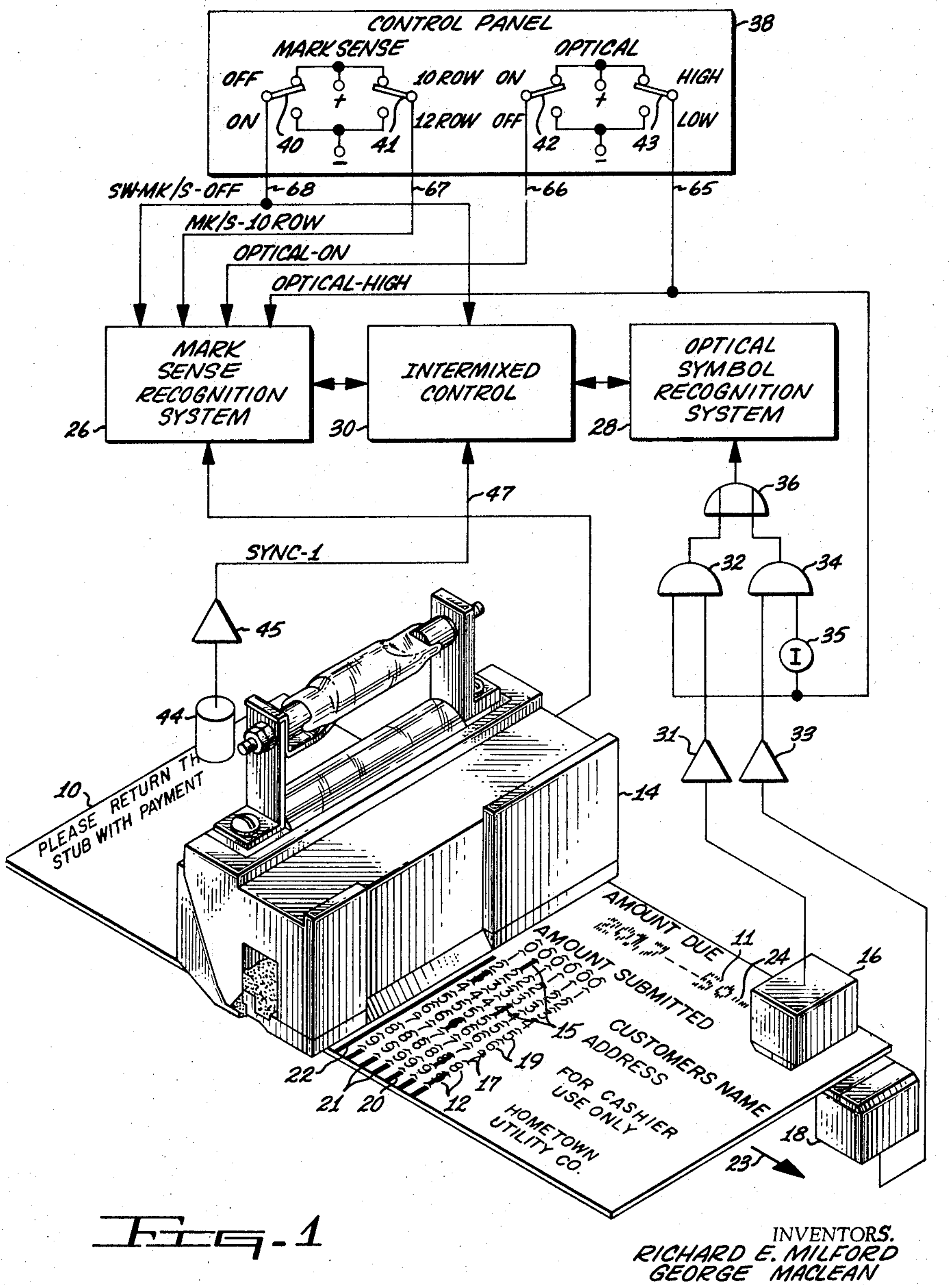
FIG. 1 illustrates a reading station and system configuration of the invention.

FIG. 1 illustrates a document 10 bearing a plurality of optically recognizable symbols 11 and marking areas 12. An optically recognized symbol as shown herein is disclosed by Klaas Bol, et al., in copending Pat. application, Ser. No. 553,830, filed May 31, 1966, and assigned to the assignee of the present invention. This symbol is of the "spaced bar" font type of stylized human language symbols especially adapted for printing by relatively low quality printers such as high-speed computer output printers, typewriters and other common printing apparatus.

The document is moved to the right, by well-known means not shown, for scanning first the marks by a mark sense reading transducer 14 and second the symbols by either of optical reading transducers 16 and 18. A system for automatically reading such symbols is shown, for example, by Leland J. Hanchett, Jr., et al., in copending Pat. application, Ser. No. 554,148, filed May 31, 1966, entitled "Symbol Reading System," assigned to the assignee of the present invention.

As illustrated in FIG. 1, the marking areas 12 for receiving pencil or ink pen lines 15 are arranged in columns 21 and various unmarked rows to comprise a mark sense field. This field designated as an amount submitted field includes a row of timing marks 20 and is terminated by a black line 22. Symbols 11 are shown in a printing field designated as an amount due field and is preceded by a special optical Cue symbol 24 which indicates that the following symbol field is to be optically recognized.

Figure 2:
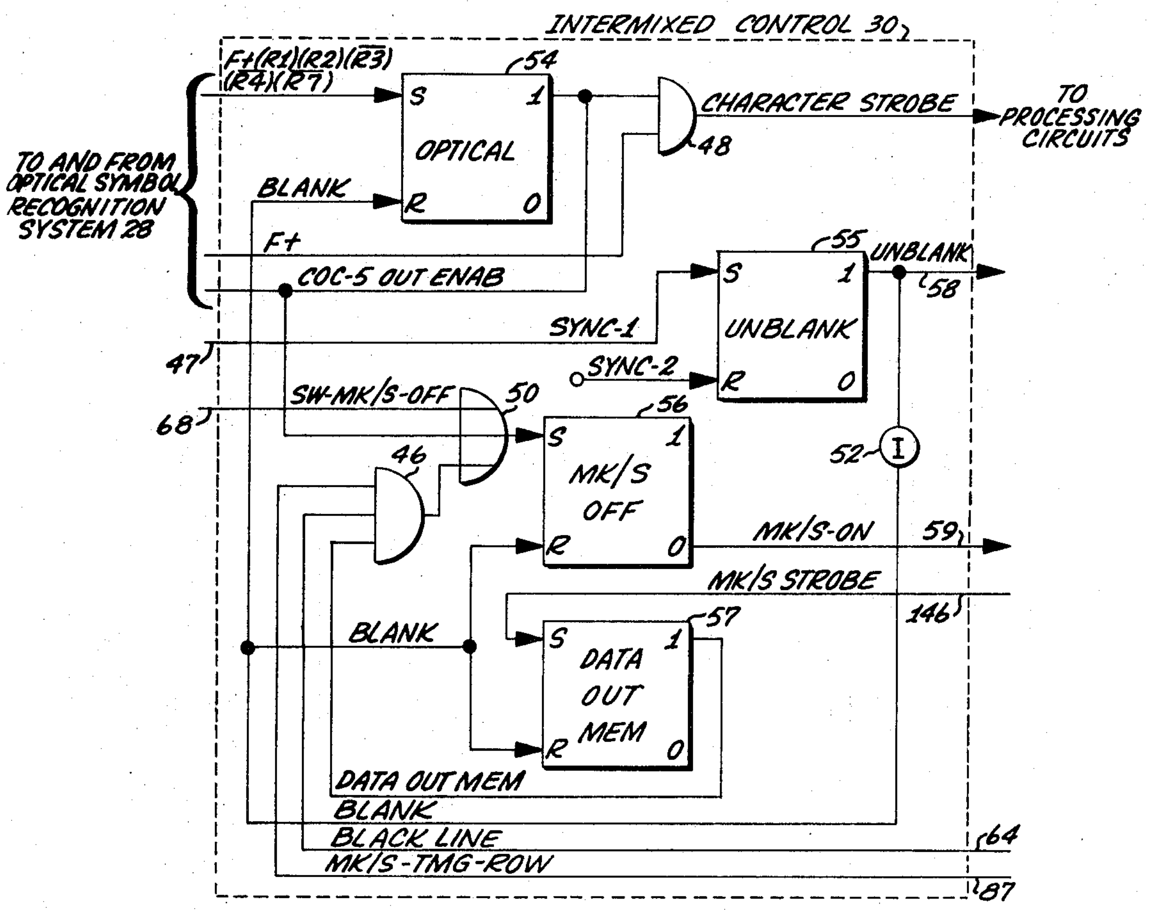
FIG. 2 is a schematic of the intermixed control logic block of FIG. 1.
Figure 7:
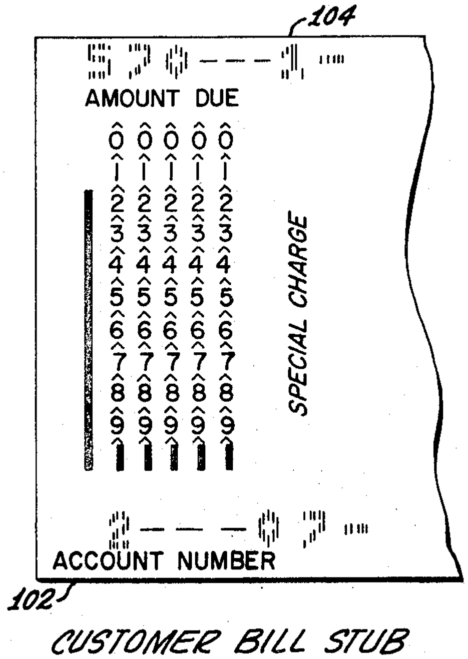
Figure 8:
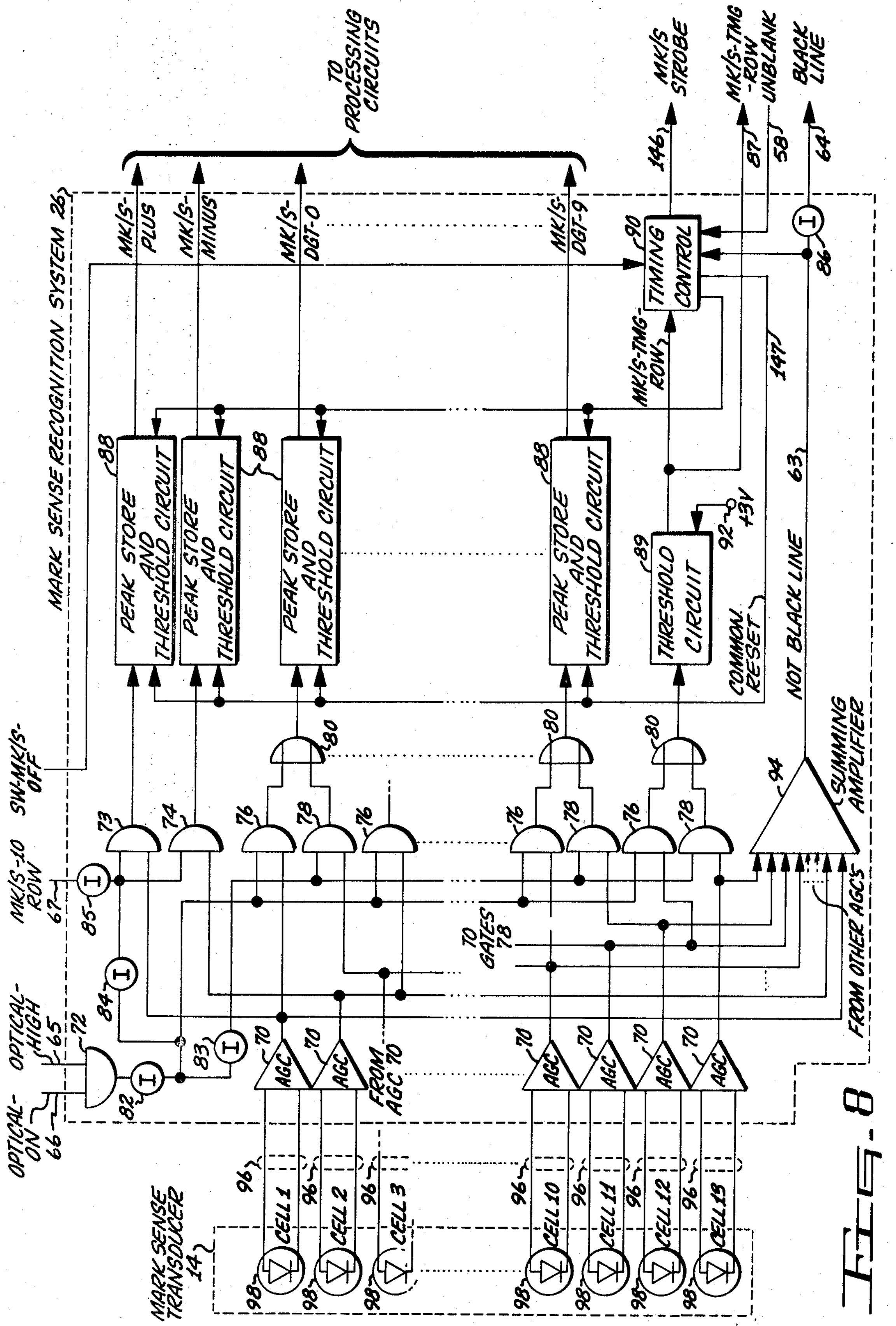
FIG. 8 is a block diagram of the mark sense recognition system and mark transducer shown in FIG. 1.

The mark sense reading transducer 14 provides signals to a mark sense recognition system 26 shown in more detail in FIG. 8. The optical symbol reading transducers 16 and 18 and respective amplifiers 31 and 33 similarly provide scanning signals selectively through one of AND gates 32 or 34 and OR gate 36 to optical symbol recognition system 28, a suitable embodiment of which is disclosed in the aforementioned Pat. application, Ser. No. 554,148. While two separate symbol reading transducers are illustrated, only one symbol sensing transducer may be employed. For example, one transducer may be selectively moved by well-known means to opposite sides of the path of movement of the document to provide scanning signals from opposite sides of the document. An intermixed control 30 (an embodiment of which is shown in FIG. 2) provides cooperation between the two recognition systems. A control panel 38 provides manually operable switches 40—43 for selectively controlling the two recognition systems for reading intermixed mark sense and optical symbol documents such as shown in FIGS. 1 and 4—7.

A sensing element 44 detects the leading edge of the document 10 and an amplifier 45 produces a SYNC-1 signal which provides initial enablement of the recognition systems. Sensing element 44 may be one of the well-known photoelectric devices adapted for document edge detection purposes.

A logic schematic of intermixed control 30 is shown in FIG. 2. This logic block comprises AND gates 46 and 48, OR gate 50, inverter 52, and a plurality of bistable multivibrators or flip-flops 54—57. OPTICAL flip-flop 54 of FIG. 2 is the optical Cue recognition flip-flop shown in FIG. 2*a* and designated flip-flop 21 in the aforementioned Pat. application, Ser. No. 554,148. In that optical symbol recognition system, the S input terminal of flip-flop 54 directly receives the optical Cue signal from a circuit represented by the logic expression $Ft(R1)(R2)(\overline{R3})(\overline{R4})(\overline{R7})$. For purposes of the present invention, this optical Cue signal is received from system 28 and is utilized for fully enabling the optical symbol recognition system as required in the present system.

Figure 3:
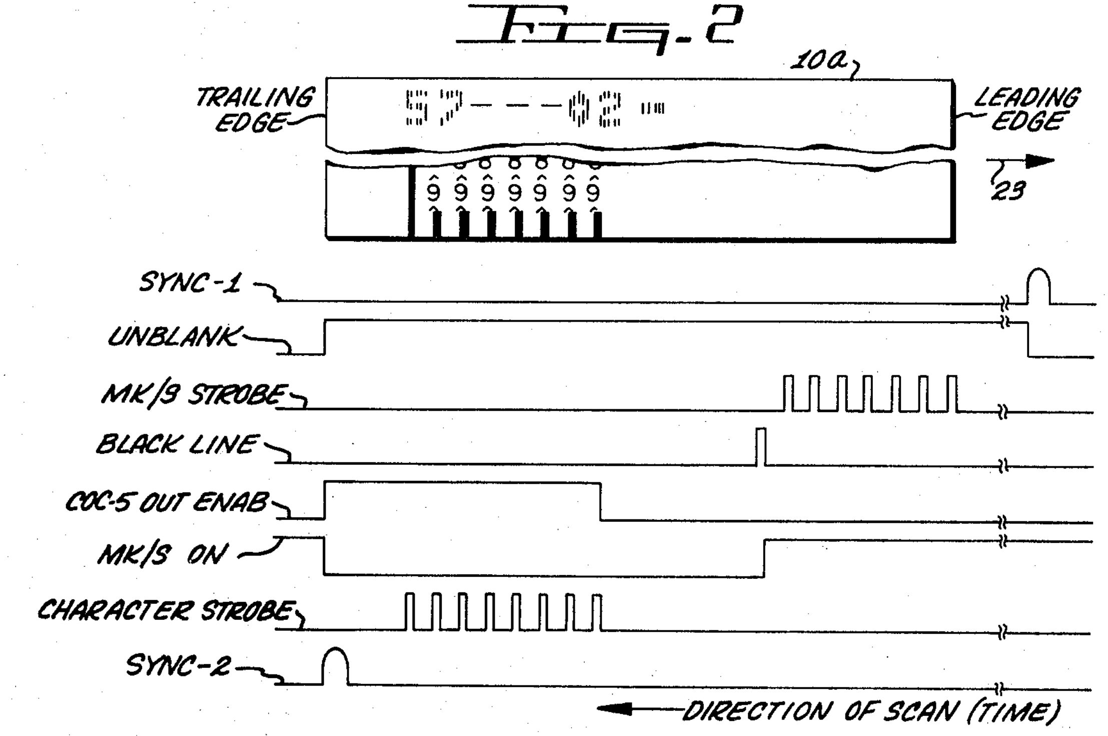
FIG. 3 illustrates waveforms of the control signals transmitted during operation of the logic of FIG. 2.

Operation of the overall system is illustrated in FIG. 3 which shows a sequence of signals for one representative case of intermixed marks and optical symbols printed on a document 10*a*. The leading and trailing edges corresponding to right and left edges of the document and the format of the mark sense and of the printing fields are shown. Since the scanning proceeds from leading edge to trailing edge, the arrangement of the fields and the sequence of signals are also shown from right to left in FIG. 3 with respect to the document.

Initially the flip-flops 54—57 are in their reset states whereby output signals COC5 OUT ENAB (designated Cue in the aforementioned copending application, Ser. No. 554,148), UNBLANK, and DATA OUT MEM from flip-flops 54, 55 and 57 respectively are at a low or disabling level and signal MK/S-ON from flip-flop 56 is at a high or enabling level.

When the sensing element 44 of FIG. 1 encounters the right edge of the document, element 44 and amplifier 45 produce the SYNC-1 signal on lead 47 which sets the UNBLANK flip-flop 55 to provide a high level UNBLANK output signal. This UNBLANK signal is applied by means of lead 58 to the mark sense recognition system 26 shown in FIG. 8. This signal remains at a high level until reading of the document is completed. With UNBLANK and MK/S-ON signals at high levels, the mark sense recognition system 26 is enabled to read a timing mark 20 and to provide an MK/S-TMG-ROW signal representing a timing mark signal in a manner to be described.

The first timing mark signal fully enables the mark sense recognition system 26 to read a first column of the marking areas and provides a high level MK/S-STROBE signal to the S input terminal of DATA OUT MEM flip-flop 57. This flip-flop is then placed in a set state to provide a high level DATA OUT MEM output signal. Each succeeding timing mark 20 enables reading a succeeding column 21 until the terminating black line 22 is read. When black line 22 is read in a manner hereinafter described, a BLACK LINE signal provided by system 26 on lead 64 of FIG. 2 is at a high level. With the DATA OUT MEM, MK/S-TMG-ROW and BLACK LINE signals all at a high level, AND gate 46 is enabled to provide an enabling signal to set MK/S OFF flip-flop 56. Flip-flop 56 transmits a low disabling MK/S-ON output signal on lead 59 to disable system 26.

Optical Symbol Recognition

Control panel 38, FIG. 1, includes an OPTICAL HIGH LOW Switch 43, which may be manually set to a "HIGH" or "LOW" position. When switch 43 is placed in the HIGH position, it provides a high level OPTICAL-HIGH signal on lead 65 to one input terminal of AND gate 32, thereby enabling scanning signals from the "high" transducer 16 to be transmitted through AND gate 32 and OR gate 36 to the optical symbol recognition system 28. This permits the optical symbols 11 to be read from the high side of document 10 as shown in FIG. 1. Optical switch 43, when placed in the LOW position, provides a low disabling OPTICAL-HIGH signal on lead 65 which is inverted through inverter 35 to provide a high enabling signal to one input of AND gate 34. Scanning signals from transducer 18, hereinafter referred to as the "low" transducer, are thereby gated through AND gate 34 and OR gate 36 to optical symbol recognition system 28. Thus, OPTICAL HIGH-LOW Switch 43 provides for selective reading of optical symbols from either side of document 10. Control switches 40—42 of control panel 38 will be described in detail hereinafter with regard to their function in control of the mark sense recognition system.

It is to be noted that the signals in FIG. 3 are based on the right edge of the document as a position reference point and upon the position of element 44 as a time reference as the document is scanned.

Upon reading and recognizing the optical Cue symbol 24 on document 10, the optical symbol recognition system 28 produces the Ft(R1)(R2)(R3)(R7) signal. This signal is applied to the S input terminal of flip-flop 54 to set flip-flop 54 for providing a high enabling COC5 OUT ENAB signal to system 28, which is designated as the signal "Cue" in the aforementioned U.S. Pat. application, Ser. No. 554,148. The COC5 OUT ENAB signal enables system 28 for recognizing each succeeding optical symbol scanned by either of transducers 16 or 18, and for additionally disabling mark sense recognition system 26. This disabling function is provided by enabling OR gate 50 to provide a high enabling signal to the S input terminal of MK/S OFF flip-flop 56. The Ft signal from system 28 is normally at a high enabling level when each succeeding optical symbol is scanned; therefore, AND gate 48 is enabled by the high enabling COC5 OUT ENAB signal in conjunction with the presence of an Ft signal. Therefore, each time a symbol following the Cue symbol is read, AND gate 48 is enabled to provide a high enabling CHARACTER STROBE signal to processing circuits for signifying the reading of a symbol. The optical symbol recognition system thus remains enabled and the mark sense recognition system remains disabled throughout the remainder of the scanning of the document.

A well-known means such as a photocell, not shown, is provided to detect the passage of the document from the reading station and to produce a signal designated as SYNC-2 which resets flip-flop 55. The UNBLANK signal from the one-output terminal of flip-flop 55 drops to a low disabling level and hence the mark sense recognition system 26 is disabled. In response to the low level UNBLANK signal, inverter 52 produces a reset signal termed "BLANK" (designated as BLK in the aforementioned copending U.S. Pat. application, Ser. No. 554,148) which is applied to flip-flops 54, 56 and 57, whereby the mark sense and optical symbol recognition systems are disabled and the overall system is placed in its initial condition.

The MARK SENSE OFF-ON Switch 40 on control panel 38 shown in FIG. 1 controls the disabling of the mark sense recognition system. When switch 40 is in the OFF position a high enabling SW-MK/S-OFF signal is provided on lead 68 for enabling OR gate 50 of FIG. 2 to produce a signal for setting MK/S OFF flip-flop 56. Flip-flop 56 in its set state provides a low disabling MK/S-ON signal on lead 59 for disabling the mark sense recognition system.

Thus, the system of FIG. 1, under control of intermixed control 30 of FIG. 2, and control panel 38 of FIG. 1, is adapted to automatically read documents printed with optically recognized symbols intermixed with marks on either side of a document in predetermined formats.

Figure 4:
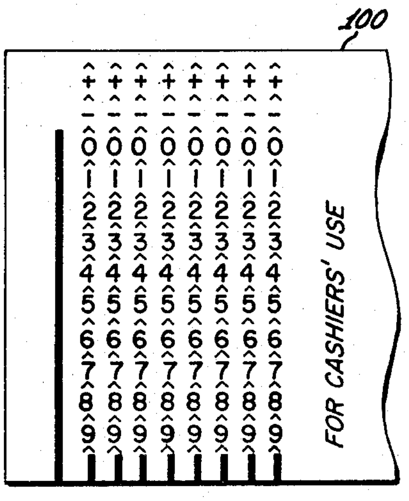
FIGS. 4 through 7 are representations of fragmentary portions of documents illustrating formats for intermixing marks and symbols on opposite sides of a document.
Figure 5:
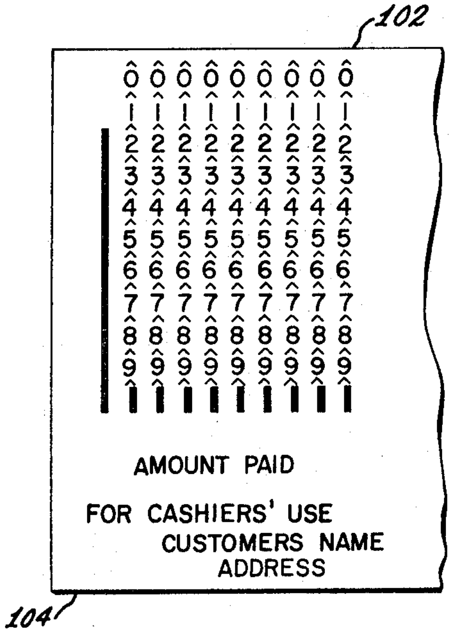
Figure 6:
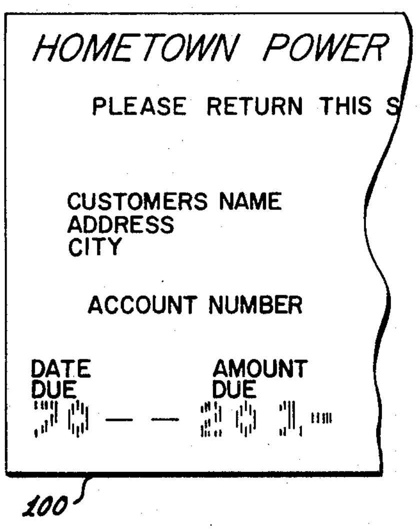

FIGS. 4 and 6 represent the face and opposite sides respectively of a document having a 12 row mark sense field on the face side and an optical symbol field on the opposite side. FIGS. 5 and 7 represent the face and opposite sides respectively of a document having 10 row mark sense fields on both the face side and opposite side and two optical symbol fields on the opposite side. The sequence of signals shown in FIG. 3 for operation of the overall system also applies for the two documents shown in FIGS. 4—7.

Mark Sense Recognition

An embodiment of the mark sense recognition system and mark sense transducer is shown in FIG. 8. This system comprises a plurality of automatic gain control circuits identified as AGC circuits 70, AND gates 78, a plurality of OR gates 80, a plurality of inverters 82—86, a plurality of peak store and threshold circuits 88, a threshold circuit 89, a timing control 90, a terminal 92 and a summing amplifier 94.

To scan the row positions 12 of document 10, the document is moved to the right as indicated in FIG. 1, by a transport mechanism not shown, past a mark sense reading transducer 14. The transducer 14 is, for example, a multichannel transducer adapted to respond to variations in light reflected from the document and the marks recorded thereon to thereby produce an electrical signal for each mark scanned. One example of such a transducer is disclosed in U.S. Pat. application, Ser. No. 764,890, filed by R. E. Milford on Oct. 3, 1968, entitled "Optical Reading Device" and assigned to the assignee of this invention.

Document 10 is illuminated by a suitable light source (not shown) and the transducer provides a plurality of reading channels 96, one of which is selected as a timing channel, the reading channels each comprising an optical-electrical energy conversion device 98, such as a solar cell. The solar cells identified in FIG. 8 may be, for example, the silicon diodes identified as cells 1—13, which are capable of producing an electrical output signal of a magnitude corresponding to the change in reflected light upon the cell resulting from the presence or absence of marks in the predesignated marking areas and from the preprinted timing marks. The predesignated marking areas 12, as shown in FIG. 1, are defined by carets 17 and numerals 19 printed in a colored ink which has a reflectance characteristic close to that of the document; therefore, the cell can detect no change of reflected light from the colored printing. One of the reading channels is provided for each horizontal row of predesignated marking areas and one for the row of timing marks on the document.

The signals from channels 96 are each applied to one of a corresponding one of AGC circuits 70 whereby the signals are amplified to establish an energy reference level such as, for example, a +8 volt signal representing a black background and a 0 volt signal representing a white background. The presence of a mark detected by a silicon diode would, therefore, provide a signal having a magnitude between 0 and +8 volts.

Any suitable AGC circuit may be employed. One AGC circuit particularly suitable for employment in the present invention is disclosed in copending U.S. Pat. application, Ser. No. 751,581, filed by R. E. Milford on Aug. 9, 1968, entitled "Automatic Gain Control Circuit for Photocell Amplifiers, " and assigned to the assignee of this invention.

The output signals from AGC circuits 70 are selectively gated through AND gates 73, 74, 76 and 78, as input signals to a corresponding one of peak store and threshold circuits 88 or as an input signal to threshold circuit 89. The output from one AGC circuit is selectively connected to the input of threshold circuit 89 to function as the timing channel for sensing the preprinted timing marks.

With reference to FIG. 1, one of the timing marks 20 is provided for each column 21 and is positioned slightly forward from the column in the direction of document travel. Considering now the operation of the timing channel of the mark sensing system, it will be assumed that a document 10 is moving past the sensing station in the direction of arrow 23. With reference to FIG. 8, it is seen that under control of signals from control panel 38, the mark sense recognition system 26 reads the timing marks from either the channel associated with cell 11 or the channel associated with cell 13. Timing mark signals are applied to respective ones of corresponding AGC circuits 70, which provide output signals to corresponding ones of AND gates 76 and 78, which are selectively enabled to apply the timing mark signals through one of AND gates 76 or 78 and OR gate 80 to threshold circuit 89.

As the document passes transducer 14, the timing channel scans the document for the preprinted timing marks that define the beginning of the mark sense field. When a timing mark is sensed, the AGC circuit associated with the selected timing channel provides an input signal to circuit 89, which responds to a signal having a higher level than a predetermined threshold level to provide a high enabling level timing mark signal identified as MK/S-TMG-ROW on lead 87. The timing mark signal is then applied to timing control 90, which provides a signal identified as a COMMON RESET signal for a predetermined time interval to each of circuits 88 for controlling the storing of signals representing marks sensed in a column of the predetermined marking areas. After a predetermined time interval, timing control 90 provides a control signal identified as a COMMON COMPARE signal to each of circuits 88, which respond to compare the magnitude of all stored input signals and provide mark sense output signals designated as MK/S-PLUS, -MINUS, and -DGT 0—9 representing the marks providing the highest magnitude of input signals. Following the presentation of output signals to processing circuits, timing control 90 provides an MK/S STROBE signal to the processing circuits to indicate that the mark sense output signals are present.

The output signals from AGC circuits 70 are selectively coupled to the input of peak store and threshold circuits 88 and threshold circuit 89. Control signals on leads 65—68 from control panel 38 are applied to AND gate 72 and inverters 82—85 which respond to provide for selectively enabling AND gates 73, 74, 76 and 78 such that output signals from AGC circuits 70 are applied to peak store and threshold circuits 88 and threshold circuit 89. The control signals from control panel 38 provide format control such that the mark sense recognition system is controlled to read 10 or 12 row mark sense fields during optical symbol recognition where symbols are read from either the high or low transducers.

Reading Representative Document Formats

With reference to the document format as shown in FIG. 1, for document 10, wherein the control panel 38 OPTICAL ON-OFF switch 42 is in the ON position and the OPTICAL HIGH-LOW switch 43 is in the HIGH position, high enabling level signals are present on leads 65 and 66 for applying to both input terminals of AND gate 72. AND gate 72 is thereby enabled to provide a high enabling level output signal which is twice inverted by inverters 82 and 83 to provide a high enabling level signal to one input terminal of AND gates 78. Thus, when high enabling level input signals are present from reading channels associated with cells 3—13, the output signals from corresponding AGC circuits 70 are applied through AND gates 78 and OR gates 80 to the input of corresponding circuits 88 and 89.

In a similar manner, control panel 38 provides control signals for reading the format as illustrated on the representation of a customer bill stub in FIGS. 4 and 6, where a 12-row mark sense field is on one side of the stub and an optical symbol field is on the opposite side of the stub.

FIG. 6 provides a representation of the stub of FIG. 4 turned over with a top edge 100 as a reference edge and a row of symbols disposed adjacent to edge 100. In this case, switches 42 and 43 are in the ON and LOW positions, respectively, whereby the OPTICAL HIGH signal lead 65 is of a low disabling level at the input terminal of AND gate 72, thereby providing a low disabling output signal which is inverted to a high enabling output signal by inverter 82. MARK SENSE ON-OFF switch 40 and 10 ROW 12 ROW switch 41 are respectively in the ON and 12 ROW positions to provide low disabling level signals on leads 67 and 68. The low signal on lead 67 is inverted through inverter 85 to provide a high enabling level signal to one input terminal of gates 73 and 74 and to the input terminal of inverter 84. Inverter 84 provides a low disabling level signal which is then inverted through inverter 83 to provide a high enabling level output signal to one input terminal of AND gates 78. AND gates 78 thereby provide for applying all high enabling level output signals from AGC circuits 70 associated with channels corresponding to cells 1—12 to corresponding ones of circuits 88 and the channel corresponding to cell 13 to circuit 89.

The optical recognition system receives input signals from the low transducer 18, shown in FIG. 1, by means of switch 43 being in the LOW position, thereby providing a low disabling level OPTICAL HIGH signal to lead 65 as previously described. Thus 12-row mark sense reading from one side of the document and symbol reading from the opposite side of the document is provided.

A third representative document format is illustrated in FIGS. 5 and 7, wherein FIG. 5 shows 10-row mark sense on a face side of the document and FIG. 7 shows two rows of symbols disposed adjacent to opposite edges 102 and 104 and a 10-row mark sense on a face side of the document. In this case, the two rows of optical symbols and two mark sense fields must be read during two passes of the document past symbol transducers 16 and 18 and mark sense transducer 14.

On a first pass of the document, switches 42 and 43 are set in the positions of ON and LOW respectively so that 10-row mark sense information shown in FIG. 5 could be read from the face side of the document and the symbols appearing in FIG. 7 could be read by transducer 18. Switches 40 and 41 will be set to the ON and 10-ROW positions respectively. A low disabling level OPTICAL HIGH signal on lead 65 is applied to one input terminal of AND gate 72, to provide a low level output signal which is inverted through inverter 82 to provide a high level signal to one of the input terminals of AND gates 76 of FIG. 8. The MK/S-10 ROW signal on lead 67 is a high level signal which is inverted by inverter 85 to provide a low level input signal to one of the input terminals of AND gates 73 and 74 and inverted a second time by inverter 84 to apply a high level signal to one of the input terminals of each of AND gates 76. Thus, during the first pass, the output signals from AGC circuits 70 associated with channels corresponding to cells 1—11 are applied through AND gates 76 and OR gates 80 to corresponding circuits 88 and 89.

Observing FIGS. 4 and 5, it is seen that a shift of the timing row position on the documents is provided, thereby releasing the portion of the document normally occupied by the timing row for other use.

During the first pass of the document, the 10-row mark sense field on the face of the document and symbols on the opposite side in a row adjacent to edge 102, FIGS. 5 and 7, are read. During a second pass of the document, 10 rows of mark sense information and one row of symbols adjacent to edge 104 are read in the same manner as described for the format shown in FIG. 1 for document 10. Edges 102 and 104 may, for example, be designated as a top and a bottom edge respectively. Before the second pass of the document, the document illustrated in FIG. 5 must be turned over with top and bottom edges of the document reversed.

Other formats are similarly read by means of control panel 38 switches which may be set in a plurality of combinations to control the reading of various combinations of intermixed marks and symbols on both sides of a document or reading only marks or only symbols from one side. For example, for the third representative doc ument format described, the mark sense field reading may be disabled during the second pass, thereby providing for reading only two rows of symbols from the opposite side of the document.

Figure 9:
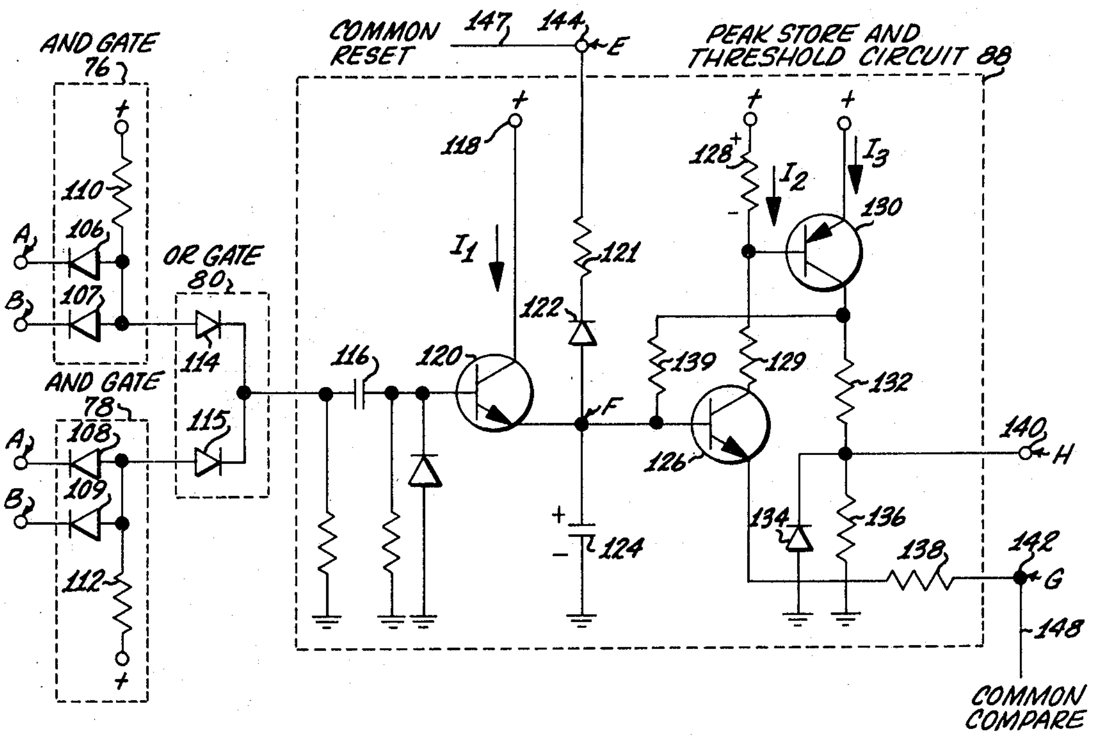
FIG. 9 is a schematic diagram of a circuit utilized to implement the function of the peak store and threshold circuit shown in FIG. 8.

A schematic circuit diagram of the AND gate circuits 76 and 78, OR gate circuit 80 and the peak store and threshold circuits 88 suitable for employment in the present invention are shown in FIG. 9 of the drawing. Operation of the circuits may be better understood by reference to the waveforms in FIG. 10, which represent signals at identified points in the circuits of FIG. 9 during a sequence of operation. The AND gate circuits 73 and 74 of FIG. 8 are the same as circuits 76 and 78; therefore, to avoid unnecessary repetition in the specification, the duplicated circuits will not be described.

AND gate 76 is comprised of diodes 106 and 107 and resistor 110 and AND gate 78, which is identical, is comprised of diodes 108 and 109 and resistor 112. OR gate 80 is comprised of diodes 114 and 115. AND gates 76 and 78 are typical of the AND gates which are utilized in the format control matrix previously described. A high enabling level control signal, such as shown in waveform B of FIG. 10, may be applied to one of the input terminals and a high enabling level mark sense signal from one of AGC circuits 70, such as shown in waveform A of FIG. 10, may be applied to the other input terminal of AND gates 76 or 78. The AND gate is thereby enabled and the high enabling level mark sense signal is coupled through OR gate 80 and capacitor 116 to the base of transistor 120.

Figure 10:
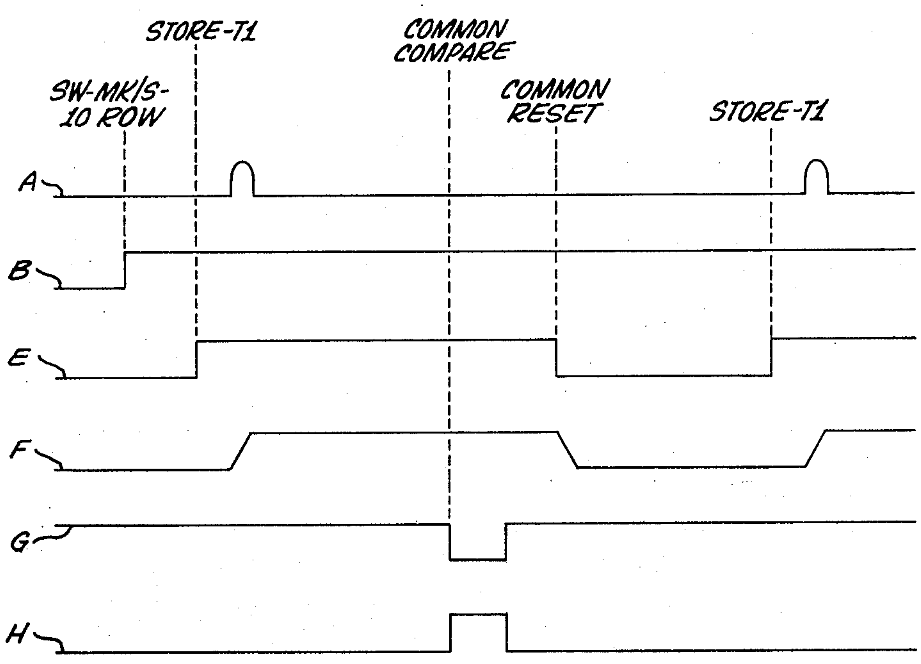
FIG. 10 illustrates waveforms of signals at various points of the circuit shown in FIG. 9.

The high enabling level signal at the base of transistor 120 renders transistor 120 conductive so that a current $I_1$ flows from a positive voltage source, which may be for example, +12v. applied at terminal 118. Current $I_1$ flows through the collector to emitter path of transistor 120 to the upper plate of peak store capacitor 124 to ground. If a positive reset signal, represented by waveform E of FIG. 10 is present at COMMON RESET terminal 144, diode 122 is nonconductive so that capacitor 124 is charged to the polarity shown in waveform F OF FIG. 10. Thus, the voltage stored across capacitor 124 represents the voltage of the peak input signal applied to one of enabled AND gates 76 or 78.

When a negative signal, such as represented in waveform G of FIG. 10, is applied to COMMON COMPARE terminal 142, the positive stored voltage across capacitor 124 renders transistor 126 conductive. When transistor 126 is rendered conductive, a current $I_2$ flows from a positive voltage source through resistor 128, through current limiting resistor 129, then from collector to emitter of transistor 126, and through resistor 138 to terminal 142. During conduction, the voltage drop across the base to emitter of transistor 126 is very low and the voltage at terminal 142 will assume a voltage which is slightly lower than the voltage at the base of transistor 126. Current $I_2$, through resistor 128, produces a voltage drop across resistor 128 such that the voltage at the base of transistor 130 decreases. When the voltage at the base of transistor 130 decreases, transistor 130 is rendered conductive.

When transistor 130 is rendered conductive, a current $I_3$ flows through the emitter to collector path of transistor 130 through resistors 132 and 136 to a source of negative voltage, which may for example, provide a negative voltage of −12v. Resistors 132 and 136 provide a voltage divider such that when transistor 130 is rendered conductive, the voltage at the collector of transistor 130 has a positive value. The positive voltage at the collector of transistor 130 is coupled through resistor 139 to the base of transistor 126, thereby latching transistor 126 and keeping transistor 126 conductive until a negative voltage applied to the base of transistor 126 renders it nonconductive. When transistor 126 is rendered conductive, a positive voltage represented by waveform H of FIG. 10 appears at output terminal 140.

When it is desired to discharge capacitor 124 and to unlatch or render transistor 126 nonconductive, a reduced or negative value of voltage is applied to the COMMON RESET terminal. When a negative voltage, as represented in waveform E, is applied to the COMMON RESET terminal, current flows from the upper plate of capacitor 124 through diode 122 and resistor 121 to terminal 144, thereby discharging capacitor 124 and rendering transistors 126 and 130 nonconductive.

The signal from an AGC circuit associated with a channel selected as the timing channel is selectively applied to threshold circuit 89. Circuit 89 may be a well-known Schmitt trigger circuit which produces an output voltage of given level in response to input voltages, which exceed a predetermined threshold level. A suitable threshold circuit for employment in this invention may be the peak store and threshold circuit 88 shown in FIG. 11 without the coupling capacitor 116, and elements 121, 122 and 124, which produces an output voltage of a given level at terminal 140 in response to input voltages which exceed a predetermined threshold level. The threshold level may be, by way of example, +3v. applied at terminal 92, FIG. 8, to the COMMON COMPARE TERMINAL 142, FIG. 9. Thus, for example, an input signal exceeding +3v. provides a high enabling level MK/S-TMG-ROW output signal to timing control 90.

Figure 11:
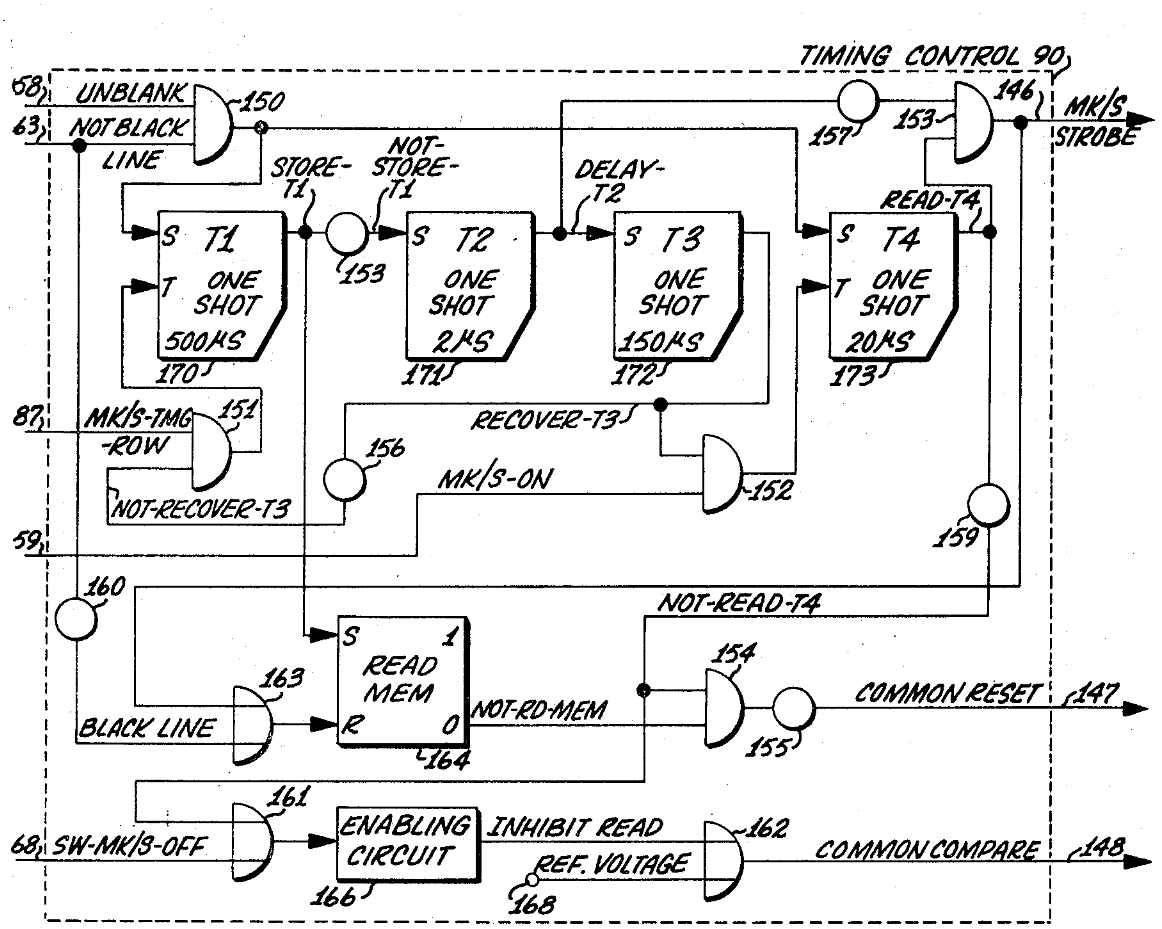
FIG. 11 is a logic schematic of the timing control block shown in FIG. 8.

A logic schematic of timing control 90 is shown in FIG. 11. Timing control 90 is comprised of the following: a plurality of AND gates 150—154; a plurality of inverters 155—160, a plurality of OR gates 161—163; a flip-flop designated as READ MEM flip-flop 164; an enabling circuit 166, and a plurality of one-shots 170—173.

Timing control 90 provides overall mark sense recognition system timing. Initially the UNBLANK signal from intermixed control 30 and the NOT BLACK LINE signal from summing amplifier 94 are at a high level to enable AND gate 150 to provide a high enabling output signal to an "e" input terminal of T1 ONE-SHOT 170 and T4 ONE-SHOT 173. When a timing mark is read, the high enabling MK/S-TMG-ROW signal from the output terminal of threshold circuit 89, FIG. 8, is applied to one input terminal of AND gate 151. The second input terminal is provided from the output terminal of the T3 ONE-SHOT 172, which is initially a low disabling signal which is inverted through inverter 156 to provide a high enabling signal to a second input terminal of AND gate 151. A high enabling MK/S-TMG-ROW signal therefore enables AND gate 151 to provide a high enabling input signal to the "t" input terminal of T1 ONE-SHOT 170. (The well-known one-shot is a two-state circuit which is normally in a stable reset state. A suitable input signal triggers the one-shot to its astable set state, in which state it maintains for a predetermined design period after which it automatically returns to its reset state. An example of such a one-shot circuit is shown by Abraham I. Pressman in FIG. 11—15 of Design of Transistorized Circuits for Digital Computers, John F. Rider, Publisher, Inc., New York, 1959.)

The output of AND gate 150 is connected to an enabling input terminal "e" of the ONE-SHOT 170 and the output of AND gate 151 is connected to a triggering input "t" on the ONE-SHOT 170. Thus, the signals from the two AND gates are logically ANDed in the input circuit of the ONE-SHOT 170. In other words, the high or enabling input from AND gate 151 triggers ONE-SHOT 170 to its astable or set state, if and only if, a positive output signal is simultaneously present at its "e" input terminal.

Figure 12:
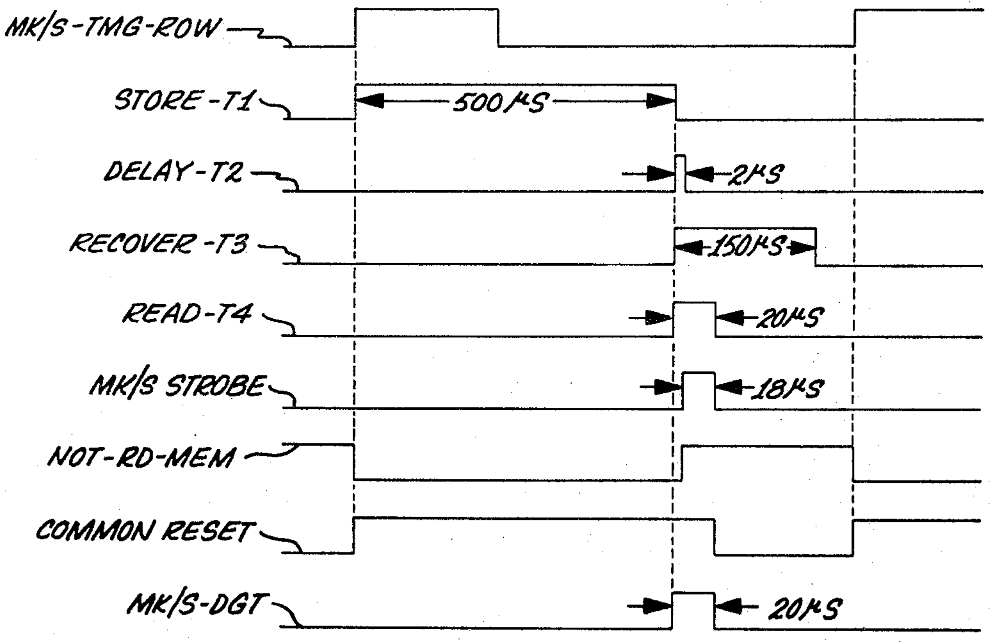
FIG. 12 illustrates waveforms of control signals generated by the timing control logic of FIG. 11.

Operation of timing control 90 is illustrated in FIG. 12, which shows the waveforms for a sequence of signals provided when reading a column of marking areas on a document. Initially, ONE-SHOTS 170—173 are in their reset states. In response to an enabling signal on the "e" input terminal of T1 ONE-SHOT 170 and an MK/S-TMG-ROW signal which enables AND-gate 151 to provide a high enabling signal at the "t" input terminal of ONE-SHOT 170, ONE-SHOT 170 is triggered to its astable or set state, in which state it remains for a predetermined design period (in the present system for about 500 microseconds) after which it returns to its astable or set state. ONE-SHOT 170 produces an output signal designated STORE-T1 to indicate that it corresponds to the time during which high enabling level input signals from AGC circuits are being stored in corresponding peak store and threshold circuits.

The STORE-T1 signal is applied to the "S" input terminal of READ MEMORY flip-flop 164 to set flip-flop 164, thereby providing a low disabling level NOT-RD-MEM signal to one input terminal of AND gate 154. AND gate 154 is, therefore, disabled thereby providing a low disabling level output signal which is inverted by inverter 155 to provide a high COMMON RESET output signal during STORE-T1 time. The COMMON RESET signal is simultaneously applied in parallel to all terminals 144 of circuits 88, such that high level input signals resulting from the scanning of a column of the marking areas are stored across corresponding ones of capacitor 124, during the STORE-T1 time. Since the marks in a column may be horizontally displaced in time, a time of 500 microseconds is allowed for storing mark signals.

With reference to the representations of timing signal waveforms in FIG. 12, it is seen that at the completion of STORE-T1 time, T1 ONE-SHOT 170 returns to its reset state to provide a high enabling level signal through inverter 158, FIG. 11, to set T2 ONE-SHOT 171. The T2 ONE-SHOT 171 then provides a high enabling level signal to trigger T3 ONE-SHOT 172 into its set state and T3 ONE-SHOT 172 provides a high enabling level signal to one input terminal of AND gate 152. The MK/S-ON signal on lead 59 from intermixed control 30, FIG. 3, at the second input terminal of AND gate 152 is initially at a high enabling level, whereby AND gate 152 is enabled to trigger T4 ONE-SHOT 173 into its set state. T2, T3 and T4 ONE-SHOTS remain in their set states for a predetermined design period (in the present system for about 2, 150 and 20 microseconds respectively) after which they return to their stable or reset states. In their astable or set states, ONE-SHOTS 171, 172 and 173 provide the respective DELAY-T2, RECOVER-T3, and READ-T4 signals shown in the waveforms of FIG. 12.

The READ-T4 high enabling signal is applied to an input terminal of inverter 159, which provides a low disabling level signal designated NOT-READ-T4 to one input terminal of AND gate 154 and also to one input terminal of OR gate 161. AND gate 154 is thereby disabled for an additional 20 microseconds beyond the STORE-T1 time to allow storing signals representing marks throughout the time that the READ-T4 signal is present. OR gate 161 is disabled providing a low disabling level signal such that enabling circuit 166 is disabled to produce a low INHIBIT READ signal to OR gate 162. A REF. VOLTAGE input from terminal 168 to a second input terminal of OR gate 162 is now at a more positive level than the INHIBIT READ signal and is now provided through OR gate 162 on lead 148 as a COMMON COMPARE signal which is applied simultaneously to terminal 142 of each of the peak store and threshold circuits 88. The terminals 142 of each of circuits 88 are all connected in parallel to provide for a comparison of all stored signals in a manner to be described hereinafter. The REF. VOLTAGE establishes a low level COMMON COMPARE threshold signal representing the lowest level signal stored, which may be detectable as representing the presence of a mark and which may render transistor 126 conductive to provide a corresponding mark sense output signal.

A suitable enabling circuit for use in timing control 90 is disclosed by Richard E. Milford in U.S. Pat. No. 3,092,732, issued June 4, 1963, entitled "Maximum Signal Identifying Circuit," assigned to the assignee of the present invention.

Peak stored signals at the base of each of transistors 126, FIG. 9, which are of a higher voltage than the REF. VOLTAGE at terminal 142 render corresponding transistors 126 conductive and the emitter of each conductive transistor 126 assumes a voltage, which is of slightly lower level than the corresponding stored signal. Since the emitter of transistor 126 is connected to terminal 142 and terminals 142 of all circuits 88 are connected in parallel, the COMMON COMPARE signal assumes a level which is slightly lower than the level of the highest peak stored signal. A high threshold COMMON COMPARE signal is thereby established by the highest level signal stored and all stored signals lower than the high threshold will render corresponding transistors 126 nonconductive. Thus, only the stored signals equal in magnitude to the highest stored signal will provide a mark sense output signal at terminals 140 of circuits 88 corresponding to the MK/S-PLUS, -MINUS, and -0—9 signals.

When not in a READ-T4 time, OR gate 161 enables the enabling circuit 166. Circuit 166, when enabled, provides a sufficiently high positive INHIBIT READ signal through OR gate 162 to COMMON COMPARE level 148 to prevent transistors 126 from conducting, thereby preventing the presence of mark sense output signals during the storing of signals, and at all times other than when the READ-T4 signal is at a high enabling level.

The READ-T4 high enabling level signal is also applied to one input terminal of AND gate 153. The DELAY-T2 signal is inverted through inverter 157 to provide a high enabling level signal to a second input terminal of AND gate 153, thereby enabling AND gate 153 2 microseconds following the provision of the mark sense output signals for generating a high enabling level MK/S STROBE signal. This latter signal is of 18 microseconds duration as represented in the MK/S STROBE waveform, FIG. 12. The MK/S STROBE signal signifies to processing circuits that a column of marking positions has been read and that mark sense output signals present on lines MK/S-PLUS, MK/S-MINUS, and MK/S-DGT-0—9 may be sampled.

The MK/S STROBE signal is also applied through OR gate 163 to reset READ MEM flip-flop 164 to provide a high enabling NOT-RD-MEM signal to one input terminal of AND gate 154 prior to resetting the peak store and threshold circuits 88. When the T4 ONE-SHOT 173 is reset at the completion of the READ-T4 time, the high or NOT-READ-T4 signal from inverter 159 is provided as a second input signal to AND gate 154. AND gate 154 is thus enabled to provide a high enabling level signal, which is inverted through inverter 155 to provide a low COMMON RESET signal to terminal 144 of each peak store and threshold circuits 88 to discharge capacitor 124 and reset circuits 88 prior to reading a next succeeding column of marking positions.

The high enabling level NOT-READ-T4 signal from inverter 159 at the completion of READ-T4 time is also applied through OR gate 161 to enabling circuit 166. Enabling circuit 166 is thereby enabled to provide a high enabling level INHIBIT READ signal through OR gate 162 as a high level COMMON COMPARE signal establishing a sufficiently high threshold level to inhibit the storage of any signals representing marks being detected until after the next timing signal has initiated a cycle of operations of the T1, T2, T3 and T4 ONE-SHOTS. Timing control 90 thus provides for synchronizing the reading of each column of mark position areas in accordance with the signal waveforms shown in FIG. 12 in response to receiving each MK/S-TMG-ROW signal, which represents the reading of a timing mark.

The RECOVER-T3 signal from T3 ONE-SHOT 172 is at a high enabling level for 130 microseconds following completion of the READ-T4 time. Thus, for an additional 130 microseconds period of time, inverter 156 provides a low disabling signal for disabling AND gate 151 during a recovery period of time to prevent the entry of any extraneous timing mark signal before timing control 90 has fully recovered from controlling the reading of a previous column of marking areas.

Each succeeding timing mark signal detected by threshold circuit 89 generates an MK/S-TMG-ROW signal which triggers timing control 90 to repeat the sequence of operations previously described for reading a next succeeding column of marking areas. This sequence of operation repeats until either a preprinted black line at the termination of the mark sense field is read or the detection of an optical Cue symbol, as previously described in the description of intermixed control 30, FIG. 2.

With reference to FIG. 8, mark sense recognition system 26 detects the presence of the preprinted black line by means of applying output signals from each of AGC circuits 70 to summing amplifier 94. Summing amplifier 94 may be of a type described in Electronic Analog Computers, Granino A. Korn and Theresa M. Korn, published by McGraw-Hill Publishing Company, Inc., Second Edition, 1956, pp. 14—16, wherein the output signal is at a high enabling level at all times except when the sum of all input signals is a quantity greater than a predetermined quantity. The output signal from summing amplifier 94 is designated as a NOT BLACK LINE signal, and is a high enabling level signal at all times other than when a predetermined number of high enabling level signals are applied from AGC circuits 70, representing the presence of a predetermined number of marks in a column of marking areas. When a sufficient number of high enabling level signals are simultaneously applied to summing amplifier 94, a low disabling NOT BLACK LINE signal is applied to timing control 90, FIG. 11, to disable AND gate 150, thereby disabling ONE-SHOTS 170 and 173 from responding to any further timing row MK/S-TMG-ROW signals.

The low disabling level NOT BLACK LINE signal is also applied to inverter 160 to provide a high enabling BLACK LINE signal through OR gate 163 for resetting READ MEM flip-flop 164. A high or enabling NOT-RD-MEM signal is thereby provided for enabling AND gate 154 to provide a low COMMON RESET signal for assuring that peak store and threshold circuits 88 do not store any further mark signals from AGC circuits 70.

The low disabling level NOT BLACK LINE signal is additionally applied to inverter 86 to provide a high enabling level BLACK LINE signal to intermixed control 30 in conjunction with the presence of an MK/S-TMG-ROW signal on lead 87 from threshold circuit 89 to AND gate 46, FIG. 2. Each MK/S STROBE signal is always provided on lead 146 from timing control 90 to set DATA OUT MEM flip-flop 57, thereby providing a high enabling level DATA OUT MEM signal to one input terminal of AND gate 46. AND gate 46 is thereby enabled by the conjunctive presence of high enabling level BLACK LINE, MK/S-TMG-ROW and DATA OUT MEM signals. AND gate 46, when enabled, provides a high enabling signal through OR gate 50 for setting the MK/S OFF flip-flop 56, to provide a low disabling level MK/S-ON signal on lead 59 for transmission to timing control 90, FIG. 11. The low level MK/S-ON signal disables AND gate 152 to inhibit the setting of T4 ONE-SHOT 173, thereby preventing the generation of an MK/S STROBE signal when a BLACK LINE is read.

An additional control signal for disabling timing control 90 is the SW-MK/S-OFF signal provided on lead 68 by control panel 38. When the MARK SENSE ON-OFF switch, FIG. 1, is in the OFF position, a high enabling SW-MK/S-OFF signal is present on lead 68 for applying through OR gate 161 to enabling circuit 166, FIG. 11, which responds to provide a high level INHIBIT READ output signal through OR gate 162. The high level INHIBIT READ signal thereby becomes a high level COMMON COMPARE signal for application to all of the peak store and threshold circuits 88 to prevent the storing of input signals from AGC circuits 70 as marks are scanned by transducer 14.

Thus, the system of FIG. 1, with the intermixed control of FIG. 2 and mark sense recognition system of FIG. 8 is adapted to automatically read documents having all optically recognized marks recorded thereon, documents printed with all symbols and documents having intermixed marks and symbols on both sides of the documents in predetermined formats.

While the principles of the invention have been made clear in the illustrative embodiments, there will be obvious to those skilled in the art, many modifications in structure, arrangement, proportions, the elements, materials and components, used in the practice of the invention and otherwise, which are adapted for specific environments and operating requirements, without departing from these principles. The apparent claims are, therefore, intended to cover and embrace any modifications within the limits only of the true spirit and scope of the invention.

We claim:

1. A system for recognizing information on a document comprising: a recognition system; first and second scanning means, said first scanning means sensing symbols on one side of the document and said second scanning means sensing symbols on the opposite side of the document, said first and second scanning means providing a symbol signal for each of said symbols sensed; means for passing said document between said first and second scanning means during a single pass of said document; control means for selectively providing a first control signal and a second control signal, one of said control signals being provided during each single pass of said document; and means being responsive to said first control signal for coupling symbol signals from said first scanning means to said recognition system and being responsive to said second control signal for coupling symbol signals from said second scanning means to said recognition system, said recognition system being responsive to a symbol signal from said first scanning means when said first control signal is provided and being responsive to a symbol signal from said second scanning means when said second control signal is provided, thereby implementing selective recognition of symbols from opposite sides of the document during each single pass of said document.

2. A system for recognizing information on a document comprising: a first recognition system including a first scanning means for sensing recorded marks on one side of the document; a second recognition system; second and third scanning means, said second scanning means sensing symbols on one side of the document and said third scanning means sensing symbols on the opposite side of the document, said second and third scanning means providing a symbol signal for each of said symbols sensed; means for passing said document past said first, second and third scanning means during a single pass of said document, said second scanning means being disposed on one side and said third scanning means on the opposite side of said document during each single pass of the document; control means for selectively providing a first and a second control signal; and means being responsive to said first control signal for coupling symbol signals from said second scanning means to said second recognition system and being responsive to said second control signal for coupling symbol signals from said third scanning means to said second recognition system, said first recognition system being responsive to each of said marks sensed on said document, said second recognition system being responsive to a symbol signal from said second scanning means when said first control signal is provided and being responsive to a symbol signal from said third scanning means when said second control signal is provided, thereby implementing recognition of marks from one side of said document and selective recognition of symbols from opposite sides of said document during each single pass of said document.

3. A mark sensing system for sensing preprinted timing marks and hand-recorded information marks, comprising: a document having information marks recorded in discrete areas and arranged in rows and columns, said information marks in a column being representative of a multiunit item wherein each information mark is representative of a unit of the item, the column position of an information mark corresponding to the place of the unit in the item, and the row position of each information mark representing the value of the unit in the item; a recognition system for recognizing said information marks and said timing marks; a timing channel and at least one reading channel, said timing channel comprising transducer means for sensing said preprinted timing marks and providing a timing signal in response to each timing mark, one of said timing signals being provided for each of said columns; a read station including means for moving said document past said reading station, said reading channel including a multichannel transducer having a plurality of channels corresponding in number to the number of discrete areas in a column for scanning said columns in succession and providing information signals to said recognition system, an information signal being provided for each discrete area of a column to indicate the presence of a mark in said area; and means responsive to one of said timing signals and a predetermined number of information signals for disabling said recognition system thereby terminating the recognition of information marks.

4. A mark sensing system for sensing preprinted timing marks and hand-recorded information marks, comprising: a document having a row of preprinted timing marks in a predetermined row position and information marks recorded in discrete areas arranged in rows and columns, said information marks in a column being representative of a multiunit item wherein each information mark is representative of a unit of the item, the column position of an information mark corresponding to the place of the unit in the item, and the row position of each information mark representing the value of the units in the item; a recognition system for recognizing said information marks and said timing marks; a timing channel and at least one reading channel, said timing channel comprising transducer means for sensing said preprinted timing marks and providing a timing signal in response to each timing mark, one of said timing signals being provided for each of said columns; a read station including means for moving said document past said reading station and said reading channel and including a multichannel transducer having a plurality of channels corresponding in number to the number of discrete areas in a column for scanning said columns in succession and providing information signals to said recognition system; and control means for providing first and second control signals selectively to said recognition system, said recognition system being responsive to said first control signal, one of said timing signals and $m$ information signals to recognize marks in $m$ number of rows of a column and being responsive to said second signal, one of said timing signals and $n$ information signals to enable recognition of marks in $n$ rows of a column where $m$ and $n$ are integers and $m$ is greater than $n$, said timing marks being in a first row position when said first control signal is present and being in a row position which is shifted $m-n$ row positions from said first row position when said second control signal is present.

5. A system for sensing information on a document comprising: a first recognition system including a first scanning means for sensing marks on said document, said marks being recorded in a plurality of marking areas arranged in columns and rows on a document and being printed in a row of preprinted timing marks, said first scanning means providing an information signal representing each of said marks sensed in a column and a timing signal representing each of said timing marks; a second recognition system including a second scanning means for sensing symbols on said document, said first scanning means being spaced ahead of second scanning means with respect to the scanning direction; means for detecting the presence of a document and for enabling said first recognition system when a document is present and for conditionally enabling said second recognition system prior to the scanning of marks on said document by said first scanning means; and means responsive to the presence of a predetermined number of information signals representing marks sensed in a column for disabling said first recognition system prior to the scanning of symbols on said document by said second scanning means.

6. A system for sensing information on a document comprising: a first recognition system including a first scanning means for sensing marks on said document, said marks being recorded in a plurality of marking areas arranged in columns and rows on a document and in a row of preprinted timing marks, said first scanning means providing an information signal for each of said marks sensed in a column and a timing signal for each of said timing marks sensed in a row; a second recognition system including a second scanning means for sensing symbols on said document, said first scanning means being spaced ahead of said second scanning means with respect to the scanning direction; means for detecting the presence of a document for enabling said first recognition system and for conditionally enabling said second recognition system prior to the sensing of symbols by said second scanning means; means responsive to the recognition of a timing signal and a predetermined number of information signals for marks sensed in a column for disabling said first recognition system; and means responsive to the recognition of a predetermined symbol by said second recognition system for disabling said first recognition system and for enabling said second recognition system.

7. A system for recognizing information on a document comprising: a first recognition system including a first scanning means for sensing recorded marks on the document, said first scanning means providing a mark signal for each mark second; a second recognition system, second and third scanning means for sensing a plurality of rows of symbols on one side of the document, one row being referenced to one edge of said document and one row being referenced to an opposite edge of said document, said second and third scanning means providing a symbol signal for each of said symbols scanned in rows referenced to said one and opposite edges respectively; transport means for passing said document past each of said first, second and third scanning means during a single pass of said document, said document being turned over with said edges reversed prior to a second pass, said second and third scanning means being disposed on opposite sides of said document during each pass; control means for selectively providing a first and second control signal, said first control signal being provided during said first pass and said second control signal being provided during said second pass; and means being responsive to said first control signal for coupling symbol signals from said third scanning means to said second recognition system during said first pass and being responsive to said second control signal for coupling symbol signals from said second scanning means to said second recognition system during said second pass, said first recognition system being responsive to each of said marks sensed on each side of said document during each pass of said document, said second recognition system being responsive to the symbol signals coupled during said first and second pass, thereby implementing the recognition of two rows of said symbols on one side of said document and recognition of marks on each side of said document during said first and second pass of said document.

8. A system for recognizing symbols on a document comprising: a scanning means for sensing symbols on opposite sides of the document, said scanning means providing a symbol signal for each of said symbols sensed; means for passing said document past said scanning means during a single pass of said document; and control means for selectively providing a first control signal and a second control signal, one of said control signals being provided for each single pass of said document, said system being responsive to a symbol signal for each symbol sensed on one side of the document when said first control signal is provided and being responsive to a symbol signal for each symbol sensed on the opposite side of the document when said second control signal is provided, thereby implementing selective recognition of symbols from opposite sides of the document during each single pass of said document.

9. A system for recognizing information on a document comprising: a first recognition system including a first scanning means for sensing recorded marks on one side of the document; a second recognition system including a second scanning means for sensing symbols on opposite sides of the document; means for passing said document past said first and second scanning means during each pass of said document; and control means for selectively providing a first control signal and a second control signal, one of said control signals being provided for each single pass of said document, said first scanning means being responsive to each of said marks sensed on said document during each pass of said document, said second scanning means being responsive to a symbol signal for each symbol sensed on one side of the document when said first control signal is provided and being responsive to a symbol signal for each symbol sensed on the opposite side of the document when said second control signal is provided, thereby implementing recognition of marks from one side of said document and selective recognition of symbols from opposite sides of said document during each single pass of said document.

10. In a document handling device in which a document is passed along a predetermined path, a system for recognizing information from multiple fields on said document, said system comprising:

a first scanning means for scanning a first predetermined field on said document as said document is passed along said path and generating output signals in response to marks recorded in said first field, a plurality of second scanning means for scanning a respective plurality of second predetermined fields on said document as said document is passed along said path and generating output signals in response to symbols in the respective second fields, said first and second scanning means being positioned relative to said predetermined path and each other such that said first field is scanned at a time different than any of said second fields, first and second recognition means for receiving output signals from said first and second scanning means, respectively, means manually operable to prior to the passage of said document along said path for selectively and conditionally enabling said first and second recognition means to recognize output signals from a selected ones of said scanning means, said selected number including at most one of said second scanning means, and means responsive to the passage of said document along said path for fully enabling said first and second recognition means for sequential recognition of output signals from said selected scanning means.

11. A recognition system as defined by claim 10 wherein there are two second scanning means positioned to scan fields on opposite sides of said document.

12. A recognition system as defined by claim 10 wherein said scanning means produce output signals in response to optical characteristics of the marks and symbols.